(12) United States Patent
Patel (10) Patent No.: US 8,708,228 B2
(45) Date of Patent: Apr. 29, 2014

(54) FINANCIAL KIOSK (76) Inventor: Kamleshkumar Patel, Bedford Heights, OH (US)

(*) Notice: Subject to any disclaimer, the term of this patent is extended or adjusted under 35 U.S.C. 154(b) by 0 days.

(21) Appl. No.: 13/542,268

(22) Filed: Jul. 5, 2012

(65) Prior Publication Data

US 2014/0008431 A1    Jan. 9, 2014

(51) Int. Cl.
G06Q 40/00 (2012.01)
G07D 11/00 (2006.01)
G07F 19/00 (2006.01)

(52) U.S. Cl.
USPC .................................................. 235/379

(58) Field of Classification Search
USPC ................... 235/379, 381; 705/39–45
See application file for complete search history.

(56) References Cited

U.S. PATENT DOCUMENTS

| | | | |
|---|---|---|---|
| 6,038,553 A | 3/2000 | Hyde, Jr. | |
| 6,129,273 A | 10/2000 | Shah | |
| 6,145,738 A | 11/2000 | Stinson et al. | |
| 6,669,086 B2 | 12/2003 | Abdi et al. | |
| 6,848,611 B1 | 2/2005 | Higgins | |
| 7,257,246 B1* | 8/2007 | Brodie et al. | 382/137 |
| 7,611,048 B1 | 11/2009 | Warren et al. | |
| 7,627,525 B2 | 12/2009 | Williams | |
| 8,332,321 B2* | 12/2012 | Bosch et al. | 705/43 |
| 8,424,755 B1* | 4/2013 | Irudayam et al. | 235/379 |
| 8,566,241 B2* | 10/2013 | Ostler | 705/41 |
| 8,573,484 B1* | 11/2013 | Irudayam et al. | 235/379 |
| 2003/0212637 A1* | 11/2003 | Turner | 705/45 |
| 2004/0078267 A1* | 4/2004 | Kimura | 705/14 |
| 2007/0080207 A1* | 4/2007 | Williams | 235/379 |
| 2010/0063928 A1 | 3/2010 | Hart | |
| 2011/0191242 A1 | 8/2011 | Allen | |
| 2013/0075466 A1* | 3/2013 | Clark et al. | 235/379 |
| 2013/0110713 A1* | 5/2013 | Ostler | 705/41 |

* cited by examiner

Primary Examiner — Tuyen K Vo
(74) Attorney, Agent, or Firm — Howard M. Cohn; Daniel Cohn (57) ABSTRACT According to an embodiment of the present invention, a system and method for cashing checks is disclosed. The system and method for cashing checks includes a financial kiosk for check cashing. The financial kiosk includes a processor-based platform for executing methods embodied in software programs incorporated in the system for check cashing. Further, an administrative processor in another location from the financial kiosk determines whether or not to cash the check.

20 Claims, 7 Drawing Sheets

FINANCIAL KIOSK

TECHNICAL FIELD OF THE INVENTION

The present invention relates generally to a system for cashing checks. More specifically, the present invention relates to a system for cashing checks with a financial kiosk.

BACKGROUND OF THE INVENTION

Many individuals and institutions use checks as a medium for monetary payment or for transferring monies to another party. Typically, an individual or institution opens a checking account with a financial institution. The financial institution provides the ability to write checks against monetary finds held in the checking account. When an individual or institution writes a check for a specified amount to another party, the party must then "cash" the check with the financial institution to obtain the specified amount on the check held by the financial institution in the individual or institution's checking account.

Large numbers of people, particularly low-wage earners, rely very heavily upon check cashing services to process their paychecks and cash advance services to manage their finances. Businesses that provide such services are an extremely valuable resource to consumers with limited liquidity and access to conventional banks. For millions of consumers, these services are a way of life. Consequently, the number of outlets offering these types of services has grown dramatically in recent years. People in need have turned such outlets into a kind of alternative banking sector.

There may be some risks involved with check-cashing transactions. Generally, check cashing services are provided from a bullet-proof enclosure. An employee of the check cash service often sits within the enclosure and determines whether to cash a customer's paycheck by referencing a computer database that includes information about the customer ("the payee") and the customer's employer ("the payor"). The employee also may contact the payor's bank in some circumstances. If the check cash service employee decides to cash the paycheck, the employee collects an appropriate amount of cash from a cash drawer within the enclosure and provides the cash to the customer. This results in many situations of robbery. In some instances, a check-cashing transaction can involve fraud. For example, a person can fraudulently misrepresent their own identity as one authorized to cash a particular check. If the check is written by an unauthorized person for a specified amount and cashed by the financial institution, the monetary funds held in the checking account may be wrongfully taken by the unauthorized person. In another instance, a person can fraudulently create a check and attempt to cash the fraudulent check. Again, monetary funds held in a checking account may be wrongfully taken by the person using the fraudulent check. Thus, a need exists for systems and methods for authenticating a check in a check-cashing transaction.

SUMMARY OF THE INVENTION

According to an embodiment of the present invention, a system for cashing checks includes a financial kiosk for check cashing. The financial kiosk includes a processor-based platform for executing methods embodied in software programs incorporated in the system for check cashing. Further, an administrative processor in another location from the financial kiosk determines whether or not to cash the check.

According to another embodiment of the present invention, a method of check cashing with an financial kiosk includes executing methods embodied in software programs for check cashing, determining whether or not to cash the check by an administrative processor, and cashing the check when it has been determined to cash the check.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting. Certain elements in some of the figures may be omitted, or illustrated not-to-scale, for illustrative clarity. The cross-sectional views may be in the form of "slices," or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

Figure 1:
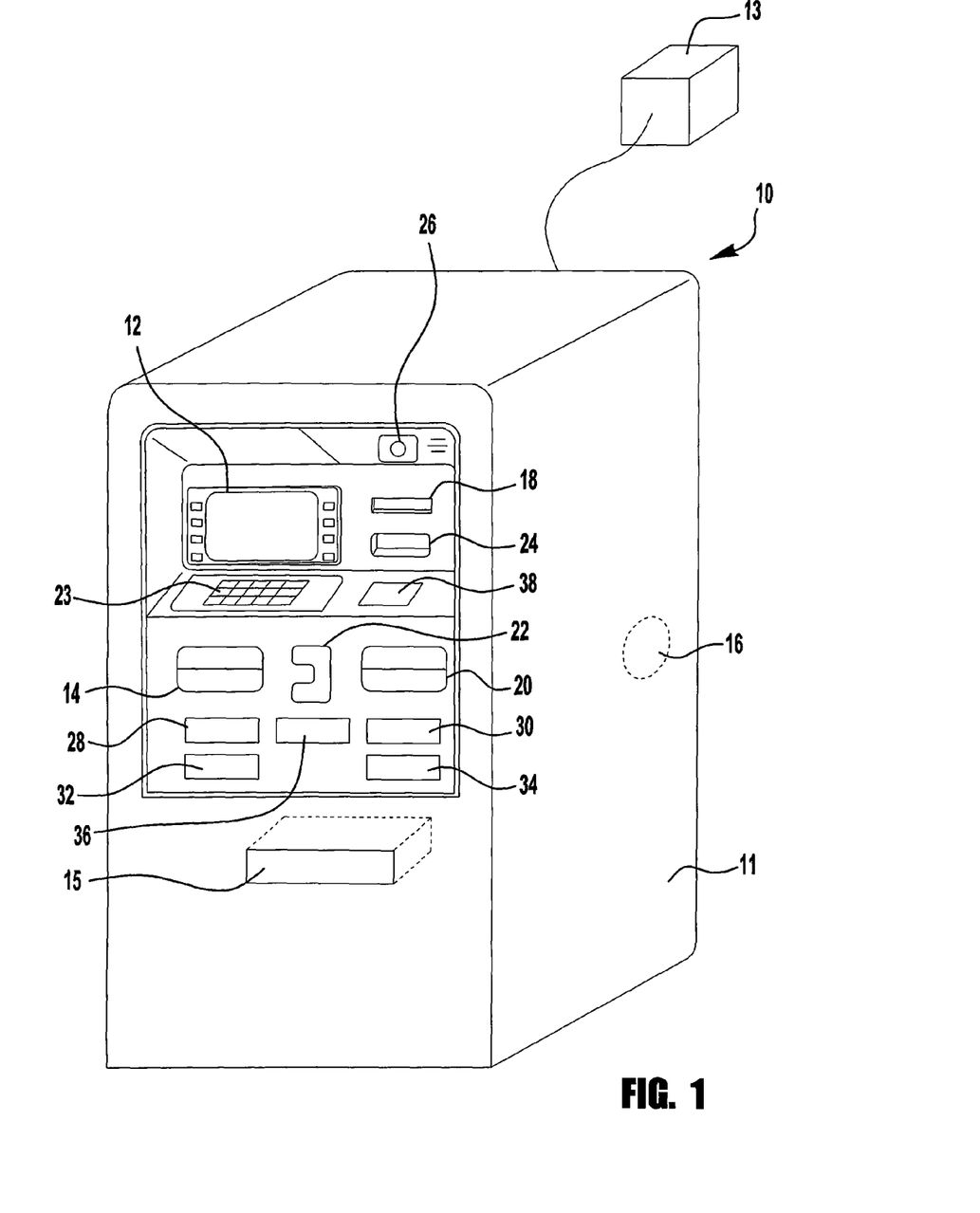
FIG. 1 is a financial kiosk, in accordance with the present invention.

The current embodiment provides a system 10 for cashing checks using an automated machine 11 generally called a financial kiosk herein. Processes 100, as shown in FIGS. 2-7 for cashing checks and processing cash advance transactions may be implemented utilizing the automated machine 11, such as automated teller machines or other self-service terminals, kiosks or computing equipment equipped for processing transactions according to principles of the embodiment described herein. The processes 100 can be incorporated in a system 10 including a check cashing apparatus, such as a financial kiosk 11, as seen in FIG. 1, that can be located in remote locations for user convenience. The financial kiosk 11 will be in communication with an administrator 13, such as a host server, or check-cashing entity that is preferably in another location from the kiosk and that administers one or more features offered by the kiosk. Hereafter, the administrator 13, as shown in FIG. 1, will be referred to as the back office or third party processor. By way of example, the kiosk 11 can include a processor-based platform 15, such as a personal computer, executing methods embodied in software programs and/or routines incorporated in check cashing system 100.

As seen in FIG. 1, the financial kiosk 11 can include, but is not limited to, a display device 12, an input device 14, a communication link 16, a card reader 18, a biometric device 20, a phone or another communication device 22, a keyboard 23, a check reader or scanner 24, an imaging camera 26, a receipt printer 28, a document scanner 30, a check printer 32, a cash dispenser 34, a bill acceptor 36, and a pinpad 38. As illustrated, pinpad 38 can be hardware, or the pinpad may be displayed upon the display device 20. The processor-based platform 15 can execute imaging character recognition software or routines or otherwise be able to access character recognition software or routines executed in a remote location. Furthermore, the processor-based platform 15 can be in communication with the server, or check-cashing entity via the communication link 16 operable to communicate via the Internet, wireless communication, telecommunications, or another mode of communication. The back office or third party processor 13 can include or otherwise access a processor-based platform executing associated methods embodied in software programs and/or routines. Typically, the back office or third party processor 13 communicates with the processor-based platform 15 in the financial kiosk 11 via the communication link 16. The back office or third party processor 13 can include or otherwise communicate with an associated call center, such as at a banking facility, that is in communication with the financial kiosk 11 via a phone or another communication device associated with the financial kiosk.

Figure 2:
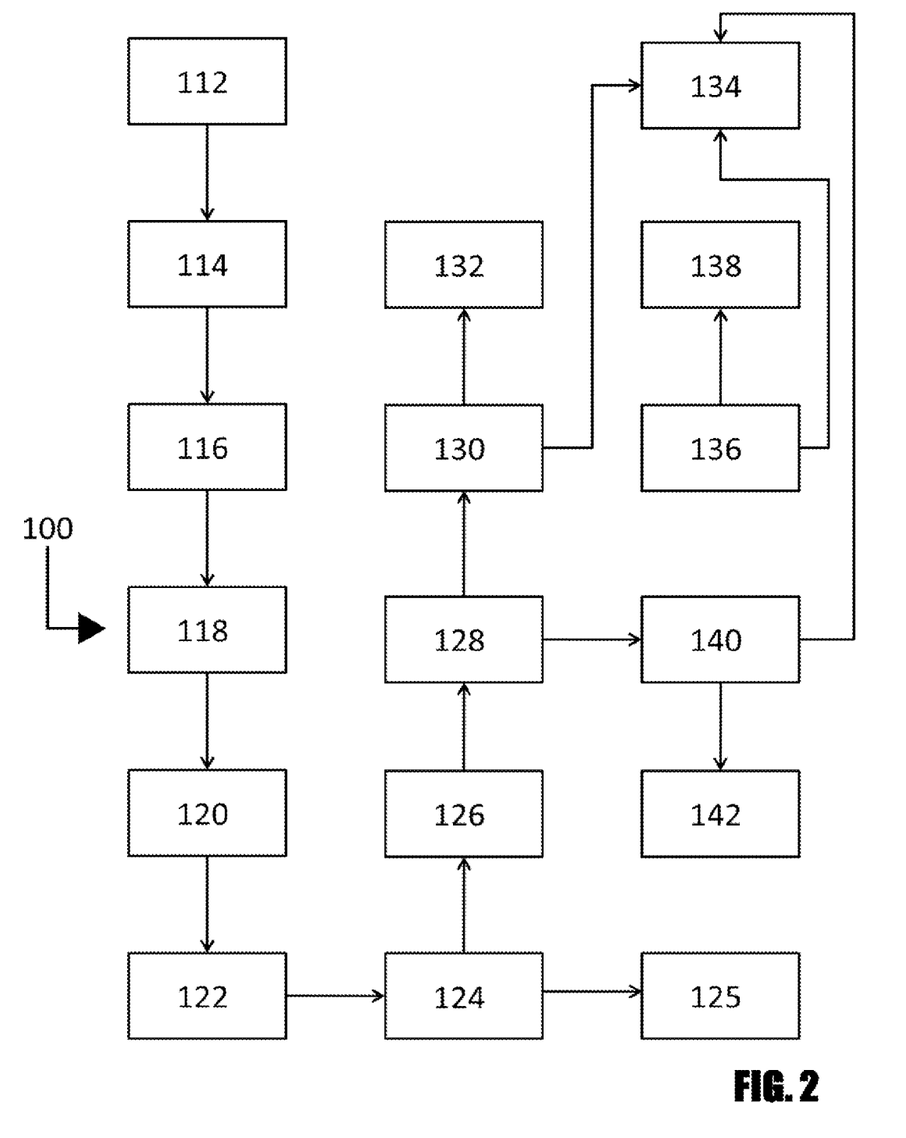
FIG. 2 is a listing of the steps required for the method of cashing checks using an financial kiosk, in accordance with the present invention.

Referring to FIG. 2, a flowchart of the exemplary check cashing system 100 according to a preferred embodiment is shown. In Step 112, a customer approaches the financial kiosk 11 and the selects the option of check cashing, from a menu of options on display 12 which can include, but is not limited to options such as: Check Cashing, ATM functions, Money Order purchase, Money Transfers (Send/Receive), Stored Value cards (Phone Cards, Retailers, etc.), Obtaining Credit Bureau Files, and Internet shopping. The kiosk menu can be presented to the consumer or user in one or more languages. A consumer or user may be given the option to select a particular language such as English, Spanish, or any other language that has financial relevance in a particular check-cashing market. Based on the language selected, all subsequent kiosk menu options and screens will be presented in that language.

In Step 114, the processor-based platform 15, such as a personal computer, checks the status of the hardware embodied in financial kiosk 11, to determine whether the hardware of the kiosk is inactive in a sleep mode or fully active. If the hardware is inactive, the financial kiosk 11 will not accept the check within check reader or scanner 24. However, if the hardware is active, the financial kiosk 11 is available to receive the check, and the customer inserts the check into the check reader or scanner 24.

In Step 116, the check scanner 24 within the financial kiosk 11 reads and checks the Magnetic Ink Character Recognition (MICR) of the check inserted into the reader or scanner 24, to determine whether or not it is a legitimate check. If not legitimate, the check is returned to the customer, and if the check is verified as being legitimate, the steps of the check cashing process 100 continue.

In Step 118, the check scanner 24 creates an image of the check which is then recorded. Further, the check scanner 24 records both the account number and routing number of the check. Utilizing OCR software, the financial kiosk 11 reads and records the check payor, the check payee, the date of the check, the amount (both Legal Amount Recognition (LAR) and the numerical amounts), the payor's signature (found on the front of the check), and the payee's signature (found on the back of the check). Although not strictly necessary, it is within the terms of the preferred embodiment that the information recorded by the check scanner 24, and the information recorded by the OCR software is compared. If the information recorded by the check scanner 24 and the OCR software don't agree, then all of the information is sent to the back office or third party processor 13 via a server. Under these circumstances, the back office or third party processor 13 will justify the disputed information and send the corrected information back to the financial kiosk 11.

In Step 120, the financial kiosk 11 will check the system 10 to determine whether the check is from a new payor, or one who already exists in the system. If it's from an existing payor, the payor's status is checked to determine whether the payor is flagged as not credit worthy. In the event that the payor is flagged as not credit worthy, this information will be sent via server to the back office or third party processor 13 to determine whether or not to approve the check. If the check is denied, it will be returned to the customer through the check scanner 24. If the check is approved, the steps of the check cashing process 100 continue.

In Step 122, the customer is prompted by a display device 12, such as a screen, which is showing an image of the check, to enter the check amount. Using the associated input device 14, such as a keyboard 23 or pinpad 38, the consumer enters the check amount. If the correct amount is entered, the steps of the check cashing process 100 will proceed. If the amount that the customer enters does not match the recorded amount, then this information will be sent via server to the back office or third party 13 for resolution. Generally, the correct amount will be entered by the back office or third party 13 and returned to the financial kiosk 11 so that the steps of the check cashing process 100 continue. It is within the terms of the invention that Step 122 not be included in process 100.

In Step 124, the financial kiosk 11 checks the processor-based platform 15 for the denomination of bills it has stored in the kiosk to determine whether it has sufficient funds to dispense to the customer. If insufficient funds are available, the processor-based platform 15 notifies the back office or third party 13 that it does not have the required funds and the check is returned to the customer, in Step 125. If the kiosk 11 has the required funds, the steps of the check cashing process 100 will proceed.

In Step 126, the financial kiosk 11 will verify the identity of the customer, by asking the customer to identify himself using the hardware of the kiosk. This identification method may include entering a social security number using a keyboard 23, pinpad 38, touch-sensitive screen 12 or other user input device suitable for entering the data, along with an ID card that is swiped with a magnetic stripe along a magnetic card reader 18, or by manually inputting the pertinent information using a keypad, touch sensitive screen or other input device. Alternatively, biometric information such as a thumbprint, fingerprint and/or retinal scan may be obtained using a suitably equipped scanner or biometric device 20. By way of example and not limitation, a fingerprint scanner 20 may shine a light against the customer's finger (e.g., thumb), the reflection being picked up by a CCD (charge-coupled device) camera. The image of the finger may then be processed by a controller, recording certain data points, called "minutiae", which describe the fingerprint layout. Additionally, the customer may be digitally photographed using the camera 26 of the financial kiosk 11. The resulting digital photograph may be associated with the other identification information and any ensuing transaction. Once the customer is identified in the server database, the check cashing process will proceed.

In Step 128, the processor-based platform 15 of financial kiosk 11 determines whether the customer is new or already exists in the system. If the customer exists in the system, then in Step 130 information about the customer will be sent via server to the back office or third party 13 to check on the status of the customer and determine whether he/she is authorized to cash the check.

If the back office or third party 13 determines that the check should not be cashed, then in Step 132, the check is returned to the customer. Alternatively, if the back office or third party 13 determines the status of the customer is clear, and there are no indications that the check should not be cashed, then the check cashing process 100 will proceed in step 134.

If in Step 128, it is determined that the customer (payee) or the payor issuing the check are new to the system, additional steps that are required to enter the new customer and/or new payor into the system. In Step 136, the customer is new to the financial kiosk 11 system. First, the financial kiosk 11 will ask for identification from the customer, such as with a driver's license or credit card. By way of example and not limitation, the customer's name, address, date of birth, phone number, credit card information, driver's license information, a social security number, biometric information, and a photograph may be requested and or collected. Driver's license information may be entered by swiping a driver's license with a magnetic stripe along the magnetic card reader 18, or by manually inputting the pertinent information using the keypad 23, the touch sensitive screen 12 or any other comparable input device. Similarly, credit card information, if used, may be entered by swiping the card with a magnetic stripe along the magnetic card reader 18 Likewise, a social security number may be entered, using the keyboard 23, pinpad 38, the touch-sensitive screen 12 or other user input device suitable for entering the data.

In Step 136, all of the information that has been collected is sent to the back office or third party processor 13 via a server for approval. Then, the back office or third party processor 13 will determine whether or not to cash the check. It is within the terms of the preferred embodiment that the determination as to whether or not cash the check is determined utilizing one or more risk assessments. For example, the back office or third party processor 13 can execute a Membership Application Process (MAP) or routine to authenticate the consumer's identity. Furthermore, the back office or third party processor 13 can execute a check-cashing risk assessment process or routine to assess or evaluate the risk involved in a particular check-cashing transaction involving the payor of the check presented. If the back office or third party processor 13 determines not to cash the check, it will be returned to the customer in Step 138. If the back office or third party 13 authorizes the payor, the steps of the check cashing process 100 will proceed to Step 134.

In Step 140, the check payor is new to financial kiosk 11 system. First, the financial kiosk 11 will identify the payor from the check. Any information about the payor will be sent via server to the back office or third party processor 13 to check on the status of the payor and determine whether the payor is a legitimate concern and able to back the check.

In Step 140, all of the information that has been collected is sent to the back office or third party processor 13 via a server for approval. Then, the back office or third party processor 13 will determine whether or not to cash a check issued by the particular payor. It is within the terms of the preferred embodiment that the determination as to whether or not cash the check is determined utilizing one or more risk assessments. For example, the back office or third party processor 13 can execute a Membership Application Process (MAP) or routine to authenticate the payor's identity. Furthermore, the back office or third party processor 13 can execute a check-cashing risk assessment process or routine to authenticate the check being presented by a consumer, and to assess or evaluate the risk involved in a particular check-cashing transaction involving the consumer and the check presented. If the back office or third party processor 13 determines not to cash the check, it will be returned to the customer in Step 142. If so, the steps of the check cashing process 100 will proceed at Step 134.

Figure 3:
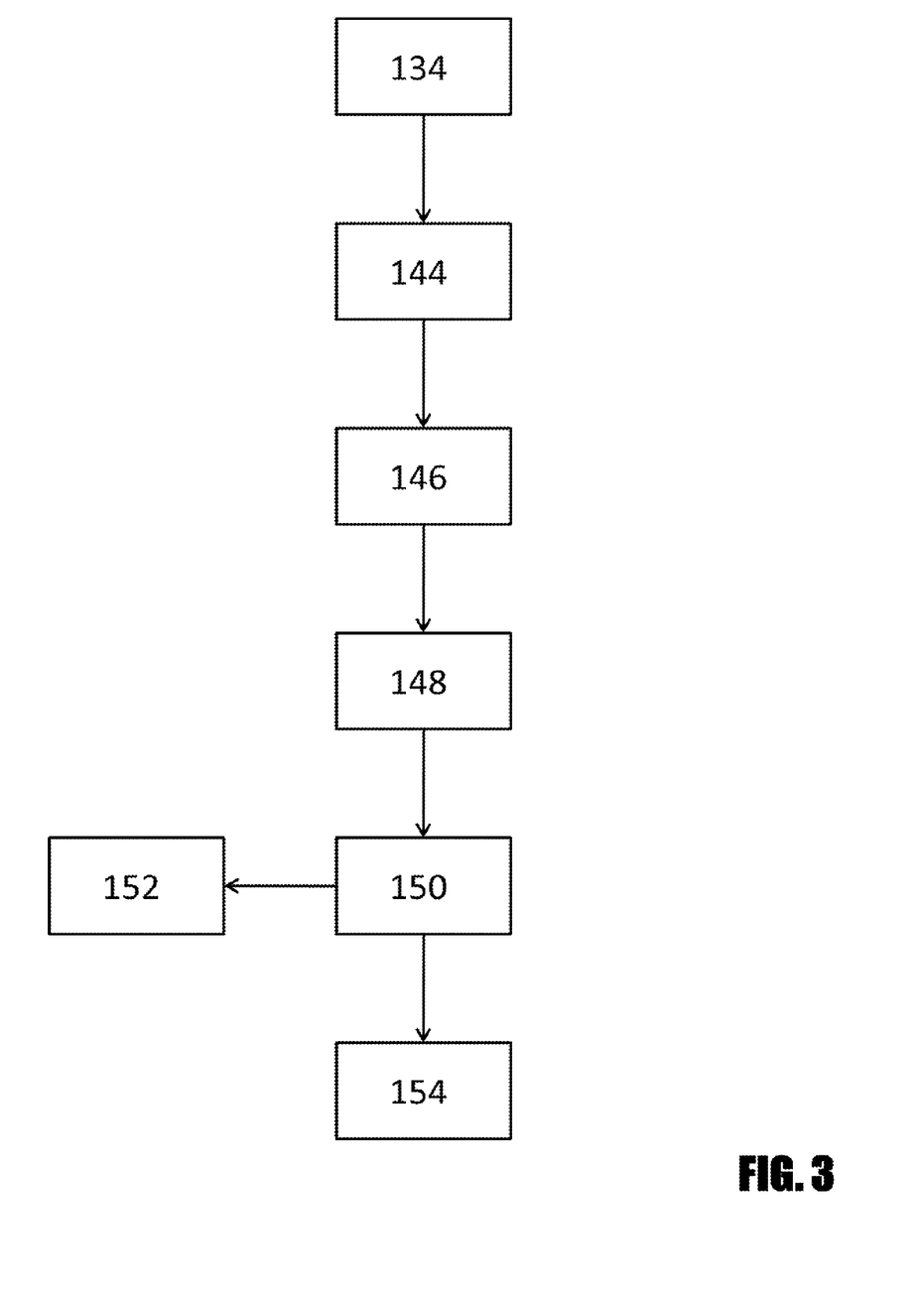
FIG. 3 is a listing of the steps required for the method of cashing checks using an financial kiosk for a new customer and a new payor, in accordance with the present invention.

Referring to FIG. 3, in Step 144, the back office or third party processor 13 will enter the fee that will be charged to the customer, the minimum fee that will be charged, the number of checks per week, the maximum amount of money that will be allotted to the customer, how many checks cashed will entitle the customer to a check where no fee is drawn, and any other pertinent information. The same process will be done for the check payor.

In Step 146, all of the customer's and payor's data that was collected is recorded by the system 10 into the processor-based platform 15 and/or the third party processor 13 and the customer and payor both receive a number to be later identified by the system 10.

In Step 148, the third party processor 13 will send approval to cash the check to the financial kiosk 11. Then in Step 150, kiosk 11 will ask the customer to reenter his fingerprints to ascertain that the customer's identity is legitimate. Then, an image of the check will appear on the screen of the financial kiosk 11, as well as the fee that will be charged to the customer for cashing the check. If the customer decides not to proceed with the transaction, the check will be returned in step 152. If the customer agrees to proceed with the fee, the steps of the check cashing process 100 will proceed to step 154.

In Step 154, the money will be dispensed from the financial kiosk 11, a receipt documenting the transaction will be printed, and the check will be placed in a safe (not shown) within the financial kiosk. It is within the terms of the preferred embodiment that the server sends the images to a bank to be deposited. All of the events of the transaction will be recorded in the customer's and the check payor's profiles within the processor-based platform 15.

Figure 4:
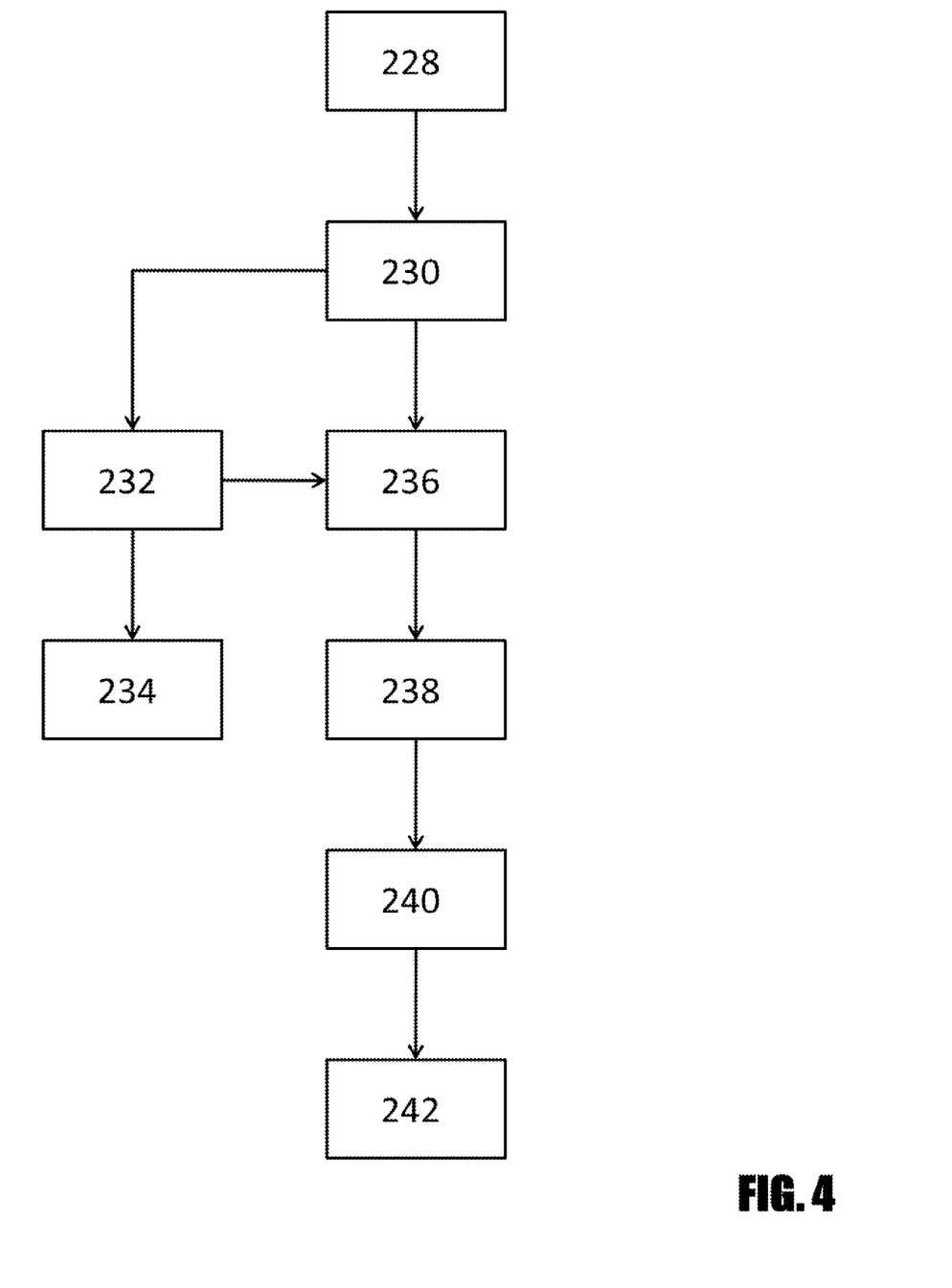
FIG. 4 is a listing of the steps required for the method of cashing checks using an financial kiosk for a new customer and an existing payor, in accordance with the present invention.

FIG. 4 illustrates steps 228-242, when system 10 has to handle a new customer and an existing payor. In Step 228, the processor-based platform 15 of financial kiosk 11 determines that the customer is new to the system 10. If in step 228, it is determined that the customer is new to the system, additional steps that are required to enter the new customer into the system. In Step 230, when the customer is new to the financial kiosk 11, the financial kiosk 11 will ask for identification from the customer, such as with a driver's license or credit card. By way of example and not limitation, the customer's name, address, date of birth, phone number, credit card information, driver's license information, a social security number, biometric information, and a photograph may be requested and or collected. Driver's license information may be entered by swiping a driver's license with a magnetic stripe through the magnetic card reader 18, or by manually inputting the pertinent information using the keypad 23, the touch sensitive screen 12 or any other comparable input device. Similarly, credit card information, if used, may be entered by swiping the card with a magnetic stripe along the magnetic card reader 18. Likewise, a social security number may be entered, using the keyboard 23, pinpad 38, the touch-sensitive screen 12 or other user input device suitable for entering the data.

In Step 232, all of the information that has been collected is sent to the back office or third party processor 13 via a server for approval. Moreover, all of the customers who have previously cashed this payor's checks, will be displayed in an image tab and customer's profiler tab from the server. Then, the back office or third party processor 13 will determine whether or not to cash the check. It is within the terms of the preferred embodiment that this is determined utilizing one or more risk assessments. For example, the back office or third party processor 13 can execute a Membership Application Process (MAP) or routine to authenticate the consumer's identity. Furthermore, the back office or third party processor 13 can execute a check-cashing risk assessment process or routine to authenticate the check being presented by a consumer, and to assess or evaluate the risk involved in a particular check-cashing transaction involving the consumer and the check presented. If the back office or third party processor determines not to cash the check, it will be returned to the customer in step 234. Otherwise the steps of the check cashing process 100 will proceed at step 236 where the amount of the check for the customer is accepted to be paid and the fee determined by the back office or third party processor 13 will be reduced from the amount of the check to be cashed. In every case there is a fee for cashing the check. Then in step 238, other information such as the number of checks allowed to be cashed per week by the customer, the maximum amount of money that will be allotted to the customer, how many checks cashed will entitle the customer to a check where no fee is drawn, and any other pertinent information will be entered into compared with the status of the amount of the check to be cashed. In Step 238, all of the customer's data that was collected is recorded by the system into the server and the customer and payor both receive a number to be later identified by the system.

In Step 240, the server will send approval to the financial kiosk 11 to cash the check. Then, an image of the check will appear on the screen of the financial kiosk 11, as well as the fee that will be charged to the customer for cashing the check. If the customer decides not to proceed with the transaction, the check will be returned. If the customer agrees to proceed with the fee, the steps of the check cashing process 100 will proceed to step 242.

In Step 242, the money will be dispensed from the financial kiosk, a receipt documenting the transaction will be printed, and the check will be admitted to a safe within the financial kiosk 11. It is within the terms of the invention that the server sends the images to a bank to be deposited. All of the events of the transaction will be recorded in the customer's and the check payor's profiles.

Figure 5:
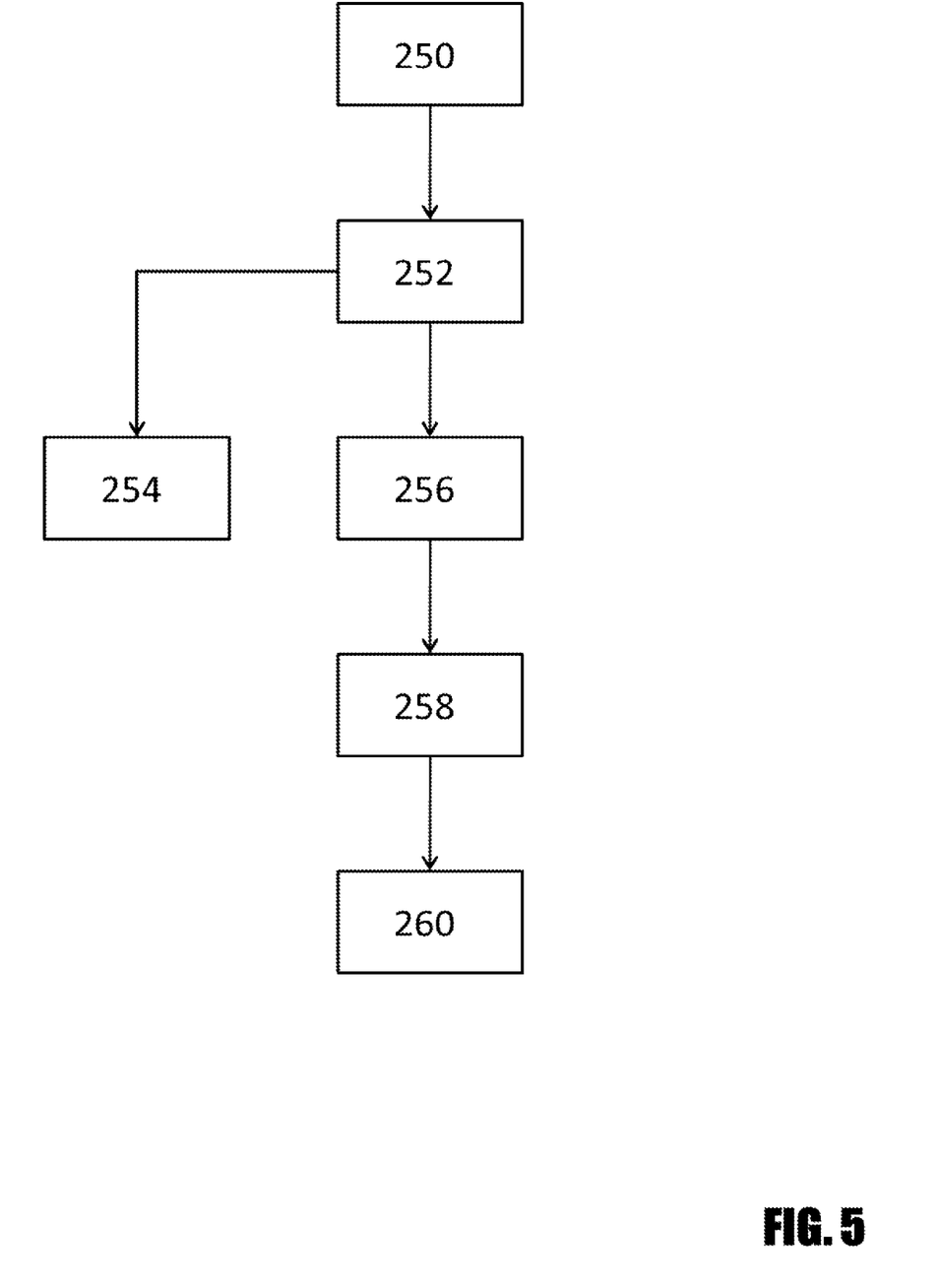
FIG. 5 is a listing of the steps required for the method of cashing checks using an financial kiosk for an existing customer and a new payor, in accordance with the present invention.

FIG. 5 illustrates steps 250-260, for an existing customer and a new payor. In Step 250, the financial kiosk registers that the customer already exists in the system, and the check payor is new in the financial kiosk 11 system.

In Step 252, all of the information that has been collected is sent to the back office or third party processor 13 via a server for approval. Then, the back office or third party processor 13 will determine whether or not to cash the check. It is within the terms of the preferred embodiment that this is determined utilizing one or more risk assessments. For example, the back office or third party processor 13 can execute a Membership Application Process (MAP) or routine to authenticate the consumer's identity. Furthermore, the back office or third party processor 13 can execute a check-cashing risk assessment process or routine to authenticate the check being presented by a consumer, and to assess or evaluate the risk involved in a particular check-cashing transaction involving the consumer and the check presented. All of the checks that this customer has cashed will appear from the server database to contribute to whether or not this particular check should be cashed. If the back office or third party processor 13 determines not to cash the check, it will be returned to the customer at Step 254. Otherwise, the steps of the check cashing process 100 will proceed.

In Step 256, the back office or third party processor 13 will enter the fee that will be charged to the customer, the minimum fee that will be charged, the number of checks per week, the maximum amount of money that will be allotted to the customer, how many checks cashed will entitle the customer to a check where no fee is drawn, and any other pertinent information.

In Step 258, the server will send approval to the financial kiosk 11 to cash the check. Then, an image of the check will appear on the screen of the financial kiosk 11, as well as the fee that will be charged to the customer for cashing the check. If the customer decides not to proceed with the transaction, the check will be returned, see Step 254. If the customer agrees to proceed with the fee, the steps of the check cashing process 100 will proceed at step 260.

In Step 260, the money will be dispensed from the financial kiosk 11, a receipt documenting the transaction will be printed, and the check will be disposed in a safe (not shown) within the financial kiosk 11. It is within the terms of the preferred embodiment that the server sends the images to a bank to be deposited. All of the events of the transaction will be recorded in the customer's and the check payor's profiles.

Figure 6:
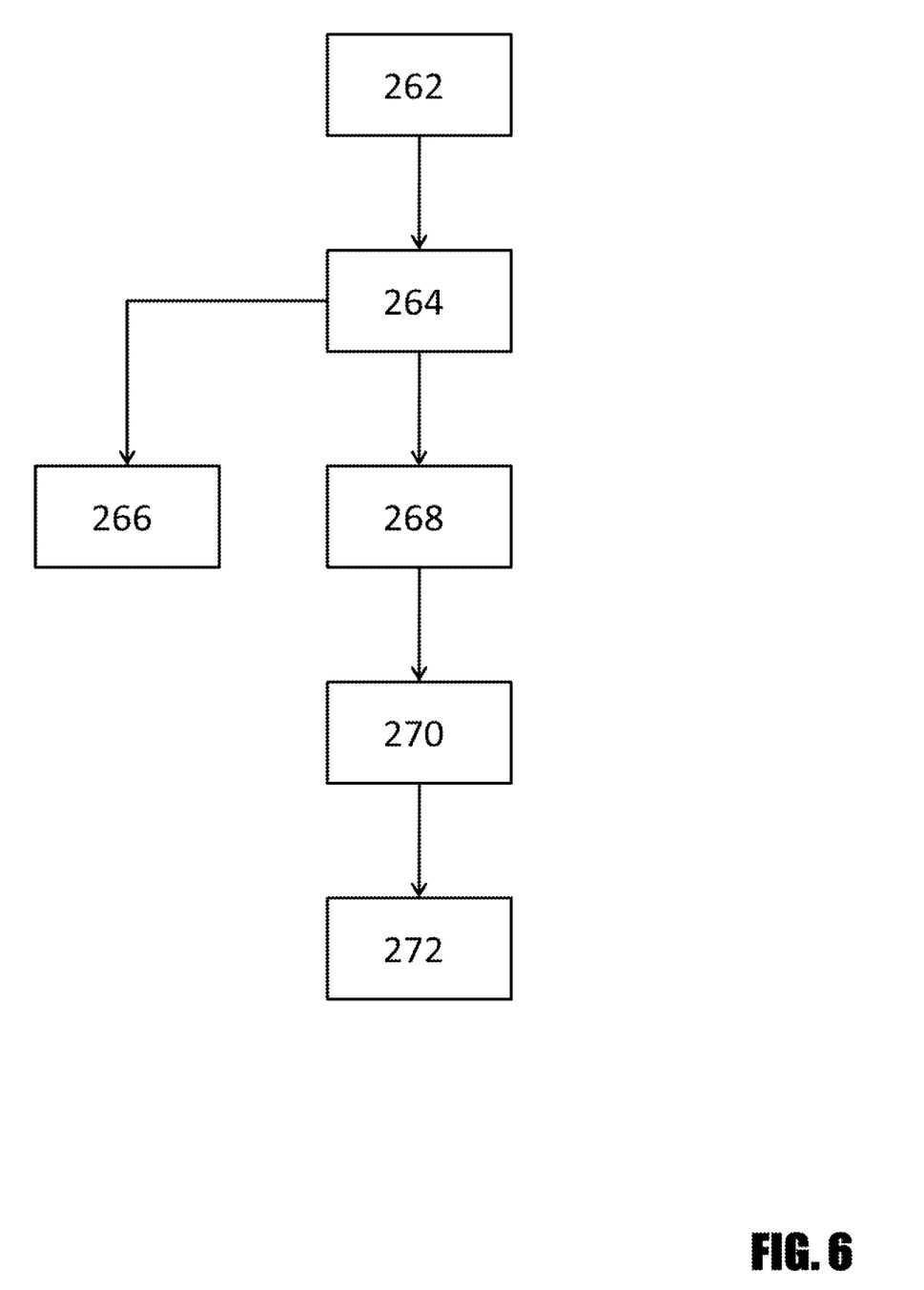
FIG. 6 is a listing of the steps required for the method of cashing checks using an financial kiosk for an existing customer and an existing payor, in accordance with the present invention.

FIG. 6 illustrates steps 262-272, for an existing customer and an existing payor. In Step 262, the kiosk will determine that both the customer and the payor both already exist in the financial kiosk 11 system.

In Step 264, all of the information that has been collected at step 262 is sent to the back office or third party processor 13 via server for approval. Then, the back office or third party processor 13 will determine whether or not to cash the check. It is within the terms of the preferred embodiment that this is determined utilizing one or more risk assessments. For example, the back office or third party processor can execute a Membership Application Process (MAP) or routine to authenticate the consumer's identity. Furthermore, the back office or third party processor 13 can execute a check-cashing risk assessment process or routine to authenticate the check being presented by a consumer, and to assess or evaluate the risk involved in a particular check-cashing transaction involving the consumer and the check presented. All of the checks that this customer has cashed will appear from the server database to contribute to whether or not this particular check should be cashed. Moreover, all of the customers who have cashed this payor's checks with image tab and customer profiler tab from the server will be opened to ensure that the payor is dependable. If the back office or third party processor 13 determines not to cash the check, it will be returned to the customer at Step 266. If so, the steps of the check cashing process 100 will proceed at Step 268.

In Step 268, the back office or third party processor 13 will enter the fee that will be charged to the customer, the minimum fee that will be charged, the number of checks per week, the maximum amount of money that will be allotted to the customer, how many checks cashed will entitle the customer to a check where no fee is drawn, and any other pertinent information.

In Step 270, the server will send approval to the financial kiosk 11 to cash the check. Then, an image of the check will appear on the screen of the financial kiosk 11, as well as the fee that will be charged to the customer for cashing the check. If the customer decides not to proceed with the transaction, the check will be returned, see Step 266. If the customer agrees to proceed with the fee, the steps of the check cashing process 100 will proceed, see Step 272.

In Step 272, the money will be dispensed from the financial kiosk 11, a receipt documenting the transaction will be printed, and the check will be admitted to a safe within the financial kiosk 11. It is within the terms of the preferred embodiment that the server sends the images to a bank to be deposited. All of the events of the transaction will be recorded in the customer's and the check payor's profiles.

Figure 7:
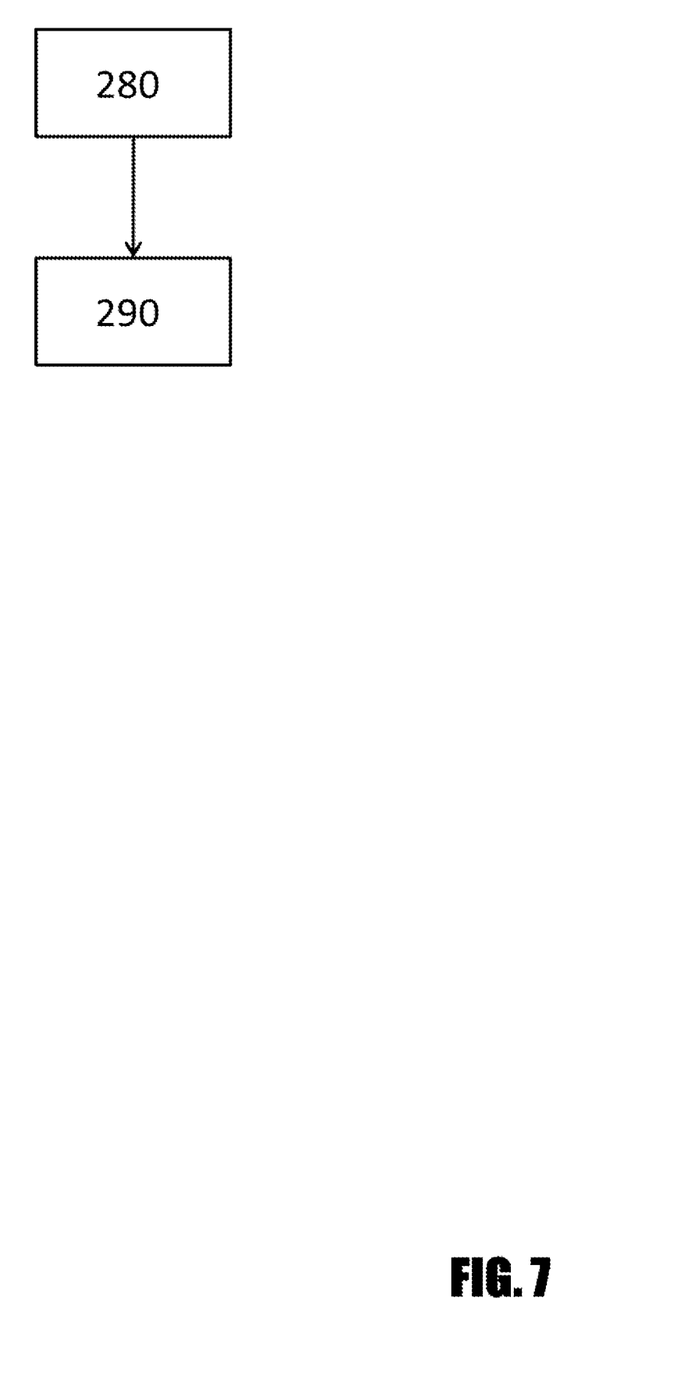
FIG. 7 is a listing of the steps required for the method of cashing checks using an financial kiosk for an existing regular customer and an existing regular payor, in accordance with the present invention.

FIG. 7 illustrates steps 280-290, for an existing regular customer and an existing regular payor. In Step 280, it will be determined by the processor-based platform 15 that the customer and the payor both already exist in the financial kiosk 11 system, and this customer has already cashed this particular payor's checks. First, the financial kiosk 11 will ask for identification from the customer, such as with a driver's license or credit card. By way of example and not limitation, the customer's name, address, date of birth, phone number, credit card information, driver's license information, a social security number, biometric information, and a photograph may be requested/collected. Driver's license information may be entered by swiping a driver's license with a magnetic stripe along a magnetic card reader, or by manually inputting the pertinent information using a keypad, touch sensitive screen or other input device. Similarly, credit card information, if used, may be entered by swiping the card with a magnetic stripe along a magnetic card reader Likewise, a social security number may be entered, using a keyboard 23, pinpad 38, touch-sensitive screen or other user input device suitable for entering the data.

In Step 290, the money will be dispensed from the financial kiosk 11, a receipt documenting the transaction will be printed, and the check will be admitted to a safe within the financial kiosk 11. It is within the terms of the preferred embodiment that the server sends the images to a bank to be deposited. All of the events of the transaction will be recorded in the customer's and the check payor's profiles.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A system for cashing checks, comprising:
a financial kiosk for check cashing without a prior membership requirement;
the financial kiosk including means for executing methods embodied in software programs incorporated in the system for check cashing;
the means for executing methods including determining whether the check is from the group consisting of a new payor and a new customer; a new payor and an existing customer, an existing payor and a new customer; and an existing payor and an existing customer;
the means for executing methods including checking both the customer and the payor's status to determine information as to whether both the customer and payor are credit worthy;
third party processor means in another location from the financial kiosk receiving the information and executing a check-cashing risk assessment process to evaluate the risk involved in cashing the check involving the customer and payor for determining whether to cash the check;
the third party processor executing a check-cashing risk assessment process to evaluate the risk involved in cashing the check involving the payor of the check presented;
the third party processor determining for the customer, a fee that will be charged, the number of checks allotted per week, the maximum amount of money that will be allotted, and how many checks cashed will entitle the customer to a check where no fee is drawn;
the third party processor determining for the payor, a fee that will be charged to the customer, the number of checks allotted per week, the maximum amount of money that will be allotted, and how many checks cashed will entitle the customer to a check where no fee is drawn;
means for providing an image of the check and the fee for cashing the check on a screen of the financial kiosk;
means for dispending cash corresponding to the check being cashed minus the fee if the customer accepts payment; and
means for returning the check to the customer when either the third party processor determines not to cash the check and the customer decides not to accept payment.

2. The system of claim 1 including a display device, an input device, a communication link, a card reader, a biometric device, a communication device, a keyboard, a check scanner, an imaging camera, a receipt printer, a document scanner, a check printer, a cash dispenser, a bill acceptor, and a pinpad.

3. The system of claim 2 wherein the means for executing methods includes a processor-based platform for accessing character recognition software in a remote location; and execute imaging character recognition software.

4. The system of claim 3 wherein the processor-based platform is in communication with a server via the communication link operable to communicate via a mode of communication.

5. The system of claim 4 wherein the mode of communication is selected from the group consisting essentially of the Internet, wireless communication and telecommunications.

6. The system of claim 5 wherein the third party processor can communicate with an associated call center that is in communication with the financial kiosk via the communication device associated with the financial kiosk.

7. The system of claim 6 where the financial kiosk includes means for check cashing, ATM functions, Money Order purchase, Money Transfers, Stored Value cards, obtaining Credit Bureau files, and Internet shopping.

8. A method for check cashing comprising the steps of;
providing a financial kiosk for check cashing without a prior membership requirement;
executing methods embodied in software programs for check cashing;
the step for executing methods including determining whether the check is from the group consisting of a new payor and a new customer; a new payor and an existing customer, an existing payor and a new customer; and an existing payor and an existing customer;
executing methods including checking both the customer and the payor's status to determine information as to whether both the customer and payor are credit worthy;
receiving the information in another location from the financial kiosk and executing a check-cashing risk assessment process to evaluate the risk involved in cashing the check involving the customer and payor for determining whether to cash the check;
determining for the customer, a fee that will be charged, the number of checks allotted per week, the maximum amount of money that will be allotted, and how many checks cashed will entitle the customer to a check where no fee is drawn;
determining for the payor, a fee that will be charged to the customer, the number of checks allotted per week, the maximum amount of money that will be allotted, and how many checks cashed will entitle the customer to a check where no fee is drawn;
providing an image of the check and the fee for cashing the check on a screen of the financial kiosk;
dispending cash corresponding to the check being cashed minus the fee if the customer accepts payment; and
returning the check to the customer when either the third party processor determines not to cash the check and the customer decides not to accept payment.

9. The method of claim 8 including locating the third party processor in another location from the financial kiosk.

10. The method of claim 9 including:
providing a menu of options on a display of the financial kiosk; and
selecting an option on the display from the group consisting essentially of check cashing, ATM functions, Money Order purchase, money transfers, stored value cards, obtaining Credit Bureau files; and Internet shopping.

11. The method of claim 10 including:
checking the status of hardware embodied in the financial kiosk to determine if the hardware is inactive when the financial kiosk will not accept a check or if the hardware is active when the financial kiosk is available to receive the check, and
inserting the check into a check scanner to determine whether or not the check is legitimate.

12. The method of claim 11 including:
recording information about the check including:
an image of the check, the account number and routing number of the check, the payor, the customer, the date of the check, the amount of the check, the payor's signature and the customer's signature; and
sending all of the recorded information about the check to the third party processor via a server.

13. The method of claim 12 including:
determining whether the check is from a new payor or one who already exists in the system;
if the check is from an existing payor, checking the payor's status to determine whether the payor is flagged as not credit worthy, this information will be sent to the third party processor to determine whether or not to approve the check.

14. The method of claim 13 including:
verifying the identity of the customer by asking the customer to identify himself using the hardware of the kiosk; and
determining whether the customer is new or already exists in the system.

15. The method of claim 14 including:
sending information about the customer to the third party processor;
checking on the status of the customer;
determining whether the customer is authorized to cash the check;
proceeding with cashing the check when the customer is authorized to cash the check.

16. The method of claim 15 including:
determining whether the customer is new to the system;
collecting identification from the customer including the customer's name, address, date of birth, phone number, credit card information, driver's license information, a social security number, biometric information, and a photograph;
sending the collected identification to the third party processor to determine whether or not to cash the check.

17. The method of claim 13 including:
determining whether the payor is new to the system;
sending information about the payor to the third party processor;
determining whether the payor is credit worthy and able to back the check.

18. The method of claim 17 including:
entering the fee that will be charged to the customer.

19. The method of claim 18 including:
displaying an image of the check on the screen of the financial kiosk as well as the fee that will be charged to the customer for cashing the check;
dispensing money from the financial kiosk when the customer agrees to proceed with the fee;
printing a receipt documenting the transaction; and
placing the check in a safe within the financial kiosk.

20. The method of claim 18 including:
recording all of the customer's and payor's data that was collected into a processor-based platform to be later identified by the system.

* * * * *